Figure 1:
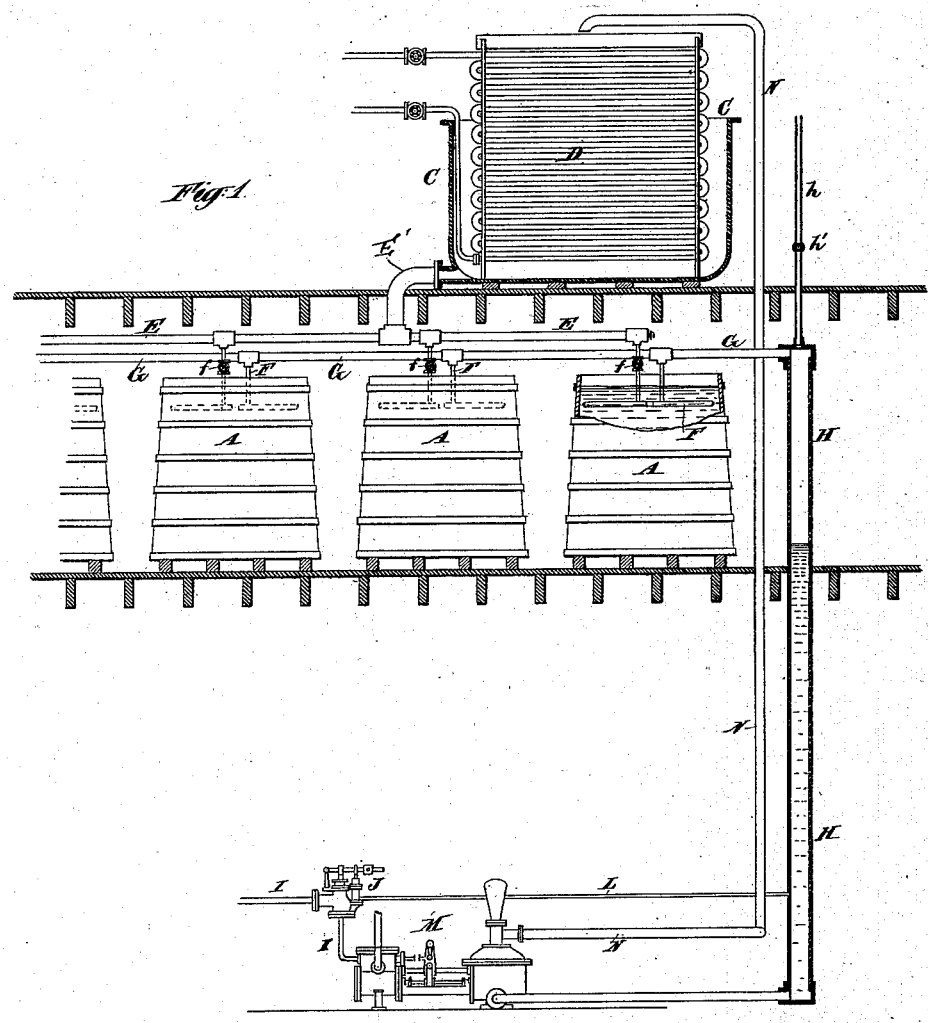

(No Model.)

E. WAINWRIGHT.
APPARATUS FOR COOLING BEER AND OTHER LIQUIDS.

No. 325,996. Patented Sept. 8, 1885.

Witnesses:
Charles R. Searle
M. F. Boyle

Inventor:
Ellis Wainwright
by his attorney
Thomas Drew Stetson

UNITED STATES PATENT OFFICE.

ELLIS WAINWRIGHT, OF ST. LOUIS, MISSOURI, ASSIGNOR TO THE DE LA VERGNE REFRIGERATING MACHINE COMPANY, OF NEW YORK, N. Y.

APPARATUS FOR COOLING BEER AND OTHER LIQUIDS.

SPECIFICATION forming part of Letters Patent No. 325,996, dated September 8, 1885.

Application filed January 7, 1885. (No model.)

*To all whom it may concern:*

Be it known that I, ELLIS WAINWRIGHT, of the city and county of St. Louis, in the State of Missouri, have invented certain new and useful Improvements in Apparatus for Cooling Beer and other Liquids, of which the following is a specification.

The invention applies to the cooling of liquids by allowing a current of water to flow through pipes immersed therein. There is always a possibility of slight leaks from pipes containing ammonia, brine, or the like refrigerating fluids, which leaks spoil or injuriously effect the material to be cooled. It is preferable to use the ammonia to cool pure water, and then use the water as a cooling agent.

I have experimented with the invention in the large way in cooling beer in tanks, and will describe it as thus applied. The quantity of cold water required varies at different times, according to the changes in the weather and other conditions. I have devised automatic means of regulating the circulating-pump. I force the water up against a constant resistance into an elevated open-topped reservoir, in which it is cooled by pipes containing expanded ammonia or other suitable cooling agency. The water from such reservoir, at a temperature near 33° Fahrenheit, is led through a system of pipes and caused to effect the cooling of the beer, being controlled in its flow by a series of cocks. Sometimes the water is allowed to flow through a greater number of such pipes, so as to cool a greater number of tanks of beer than at other times. The quantity of water pumped up in a given time requires to be correspondingly varied. My invention provides that the rate of pumping shall automatically change to correspond with the quantity of water required to be circulated.

I arrange the pump at a level considerably below the tanks of beer, and provide for a vacant space in the upper portion of a deep descending pipe, which I will term a "stand-pipe," which conducts the water to the pump. The water, after having performed its cooling functions in circulating through pipes in the several tanks of beer, descends in this vertical pipe and fills the lower portion to a certain height. As the height to which it is thus filled varies, the rate of pumping varies. Closing one of the cocks, and thus shutting off one tank of beer from the influence of the cooling-water, reduces the consumption of water, and if the rate of pumping continues the same, lowers the surface of the water in the stand-pipe. Under these conditions my apparatus diminishes the supply of steam, and the rate of pumping is reduced. When, on the contrary, additional cocks are opened to allow the cooling-water to circulate through an increased number of tanks, more water is allowed to flow down, and if the rate of pumping continues the water-level in the stand-pipe rises. This supplies more steam to the steam-pump, and the pump works faster. The arrangement insures an automatic regulation of the action according to the rate at which the water descends from the tank. The regulation is effected through the medium of a pipe leading from the lower portion of the stand-pipe to one end of a cylinder, in which is inclosed a piston subject to the influence of a weight, spring, or other constant force in opposition to the pressure of the water. This piston is connected to the steam-valve. As the pressure of the water increases, by reason of the water level in the stand-pipe being raised, the piston yields to the water-pressure and contracts the supply of steam. When the water-level in the stand-pipe is lowered, the pressure under the piston is correspondingly reduced, and the constant force overcomes the pressure of the water, and the supply of steam is increased.

The following is a description of what I consider the best means of carrying out the invention:

The accompanying drawings form a part of this specification, and represent the novel arrangement with so much of the ordinary parts as is necessary to indicate their relation thereto.

Figure 2:
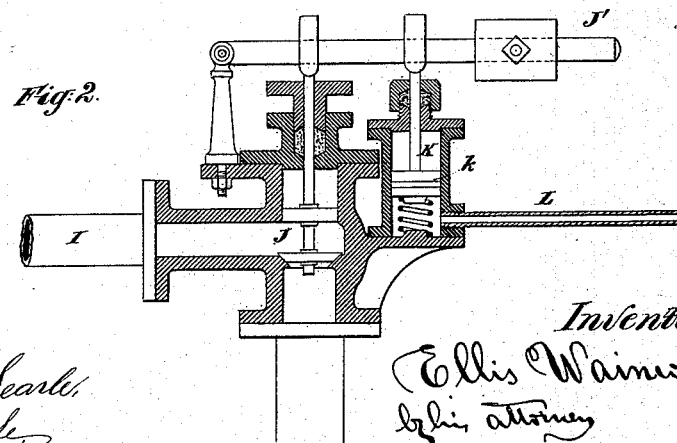

Figure 1 is a side elevation, partly in section, showing the entire apparatus. Fig. 2 is a vertical section through a portion on a larger scale.

Similar letters of reference indicate corresponding parts in both the figures.

A A, &c., are tanks of beer. C is an elevated reservoir containing a system of pipes, D, which, by ammonia or other means, (not shown,) operated in the well-known way, are kept at a low temperature.

E is a pipe connected to tank C by a pipe, E', and leading cold water across the top of the beer-tanks A.

G is a pipe running parallel to E and communicating with a stand-pipe, H, which allows any water received therein to descend to the steam-pump M. The pipe G should be of sufficient diameter to remain only partly filled. The stand-pipe H may be still larger. It is provided at its upper end with a ventilating-pipe, $h$, and stop-cock $h'$, which, when said cock is open, allow free induction and discharge of air. I prefer under most circumstances to drive out all the air by filling the stand-pipe entirely with water, and then tightly close the cock $h'$. The stand-pipe is afterward kept only partially filled with water, there being a tolerably perfect vacuum above the surface thereof.

F F, &c., are small pipes connecting the pipes E and G, and extending each down into and coiled more or less within a beer-tank, A. The flow of water through each pipe F is controlled by a cock, $f$. By opening all the cocks $f$ the water circulates through all the pipes F, and cools the contents of all the tanks A. When only a portion of the cocks $f$ are opened, the water flows through a corresponding number of the pipes F, with the effect to correspondingly reduce the rate of descent of the water from the tank C to the pump.

The action of the steam-pump M forces the water up through a pipe, N, according to the rate at which the steam-pump is worked, and this depends on the amount of opening of a steam-valve, J, located in the steam-pipe I, which supplies steam to the steam-pump from a boiler. (Not represented.) The lever J' of the valve is weighted, and is connected to a piston, $k$, playing freely in a cylinder, K. A pipe, L, connects the bottom of this cylinder to the lower portion of the stand-pipe H. The weight on the lever J' is adjusted so that its gravity and that of the connected parts will be balanced by the pressure of the water under the piston when the water level in the stand-pipe H is at a certain height; but when, by reason of opening communication through an increased number of the pipes F, the water flows down from the tank and is received in the stand-pipe H faster than it is pumped out, the water level in the stand-pipe rises, and under these conditions the pressure of the water under the piston $k$ increases and lifts the piston, thus increasing the opening for the flow of steam past the valve J. As a consequence, the pump works more rapidly. When, on the contrary, a greater number of cocks $f$ are closed, so that a less number of pipes F are in action, the flow into the stand-pipe H is decreased, and the water level is reduced, thus diminishing the pressure under the piston $k$, the weighted lever J' descends, contracting the steam-supply, and the pump works more slowly. The arrangement insures that the supply of water pumped into the tank C shall vary with the necessities of the case. The water from the pipe N is poured over the cold pipes D, and so distributed that it is thoroughly cooled, whatever the rate at which it is supplied and withdrawn.

I am aware that automatic control of a steam-pump has been previously obtained by a piston connected with the steam-valve with such a connection of the water-pipes as secures a varying pressure under the piston, according as the pump is required to work faster or slower; but such regulation has always been effected by variations in pressure in the delivery-pipe of the pump—that corresponding to the pipe N in this apparatus—the connection of the piston to the valve being the reverse of that here shown, so that to increase the pressure would retard the action of the pump.

By reversing the connection of the piston to the valve, and by actuating the piston by variations in the pressure of the return-pipe, (the stand-pipe H,) and giving a sufficient height to the latter, and ventilating the upper portion thereof, or forming a vacuum there, as may be preferred, I effect the regulation by changes in the pressure in the return-pipe. This gives the great advantage that the cooling-tank C is open and relieved from pressure. All the delicate parts of the apparatus are worked under the lowest pressure practicable.

I prefer to work with a vacuum in the upper portion of the pipe H, and with some of course in the unfilled space along the upper side of the pipe G. There is a tendency of air to accumulate in such space and vitiate the vacuum. To avoid this I stop the pump at intervals, and open the cock $h'$, and allow the water to entirely fill the pipes H and G, forcing out all the air through the ventilating-pipe $h$. I then close the cock $h'$, and on again setting the pump actively in operation it pumps out the water from the stand-pipe H and the connecting-pipe G, leaving a nearly perfect vacuum in the empty space above the water-level. A vacuum here induces a more active circulation of the cold water through the several small pipes F in the beer-tanks. The tank C is not only at a higher level, but is also open to the pressure of the atmosphere. The circulation therefore proceeds at the rate due not only to the difference of level, but also to the fact that the current is urged by the full pressure of the atmosphere behind it.

Modifications may be made in many of the details. I can increase the diameter of the stand-pipe H, making it in substance a tall tank. I can reduce its height so long as there is a sufficient range allowed for the variations in the height of the water-level to effect the required changes in the rate of pumping. I can change the style of the pump, and especially the style of the valve J.

The arrangement of the cooling-pipes D in the tank C, and the provisions for distributing the water thereon, may be varied. Instead of a single series of tanks, A, and a single pair of pipes, E G, with their several small connections F, I can use two or more series of tanks and two or more pipes, E G, all fitting into the same stand-pipe H.

The spiral spring may be outside instead of inside of the cylinder, or it may be replaced by a weight set on an extension of the lever J' on the opposite side of the fulcrum.

I claim as my invention—

1. In a cooling apparatus substantially as described, the combination of a stand-pipe, as H, and a steam-pump, of a cylinder having its interior connected with the interior of said stand-pipe, and a piston operated by the pressure of water in said pipe to automatically control the steam-supply to the pump, as set forth.

2. In an apparatus as described, the combination, with a reservoir, a stand-pipe, a steam-pump and connections for allowing the cooling-liquid to make a complete circuit, of the cylinder K, the pipe L, connecting said cylinder to the stand-pipe, the weighted piston k, and connections with the steam-supply, as and for the purposes set forth.

3. The combination of the stand-pipe H and cylinder K, connected to the steam-controlling valve J, steam-pump M, delivery-pipe N, open tank C, and pipe F, with a controlling-cock, f, arranged to serve as herein specified.

4. The combination of the series of tanks A, adapted to contain beer or other liquid to be cooled, the series of pipes F therein, and controlling-cocks f, the pipes E G, stand-pipe H, with its ventilating-pipe h and cock h', steam-pump M, delivery-pipe N, open tank C, and cooling means D in the latter, arranged for joint operation substantially as herein specified.

In testimony whereof I have hereunto set my hand at St. Louis, Missouri, this 19th day of December, 1884, in the presence of two subscribing witnesses.

ELLIS WAINWRIGHT.

Witnesses:
M. L. MITCHELL,
WM. A. HAZEN.